(12) United States Patent
Hopkins et al.

(10) Patent No.: US 11,044,274 B2
(45) Date of Patent: *Jun. 22, 2021

(54) POLICY EVALUATION TREES

(71) Applicant: Facebook, Inc., Menlo Park, CA (US)

(72) Inventors: Kendall Blair Hopkins, Sunnyvale, CA (US); Dwayne Lloyd Reeves, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,117

(22) Filed: Apr. 16, 2019

(65) Prior Publication Data

US 2019/0245893 A1    Aug. 8, 2019

Related U.S. Application Data

(63) Continuation of application No. 14/341,028, filed on Jul. 25, 2014, now Pat. No. 10,291,652.

(51) Int. Cl.
  *H04L 29/06*    (2006.01)

(52) U.S. Cl.
  CPC .................................. *H04L 63/20* (2013.01)

(58) Field of Classification Search
  None
  See application file for complete search history.

(56) References Cited

U.S. PATENT DOCUMENTS

| | | | | |
|---|---|---|---|---|
| 6,704,719 B1 * | 3/2004 | Ericson | ................ | G06K 9/6282 706/48 |
| 2004/0117765 A1 * | 6/2004 | Chan | ........................ | G06N 5/04 717/117 |
| 2006/0069863 A1 * | 3/2006 | Palmer | ................... | G06F 3/0605 711/114 |
| 2009/0045971 A1 * | 2/2009 | Simons | .............. | H05B 37/0272 340/9.16 |
| 2009/0046739 A1 * | 2/2009 | Ebling | ................... | G01D 21/00 370/465 |
| 2010/0106603 A1 * | 4/2010 | Dey | .................... | G01C 21/3617 705/14.63 |
| 2011/0208670 A1 * | 8/2011 | Joseph | ................... | G06Q 40/04 705/36 R |
| 2011/0246498 A1 * | 10/2011 | Forster | .................... | G06F 21/10 707/769 |
| 2012/0323827 A1 * | 12/2012 | Lakshmanan | .......... | G06F 17/18 706/12 |

* cited by examiner

*Primary Examiner* — Aleksandr Kerzhner
*Assistant Examiner* — Eddy Cheung
(74) *Attorney, Agent, or Firm* — Baker Botts L.L.P.

(57) ABSTRACT

In one embodiment, a method includes accessing policy states associated with a policy, determining that a particular policy state of the policy states should not be pruned, and generating possible next policy states for the particular policy state based on one or more policy actions and one or more costs associated with the respective policy actions, wherein each policy action is associated with one or more probabilities corresponding to one or more possibilities of resulting in one or more of the possible next policy states, wherein the respective cost associated with the policy action is determined based on one or more computing costs of the policy action resulting in the one or more of the possible next policy states in combination with the respective one or more probabilities, and wherein each policy state of the created policy evaluation tree comprises a rule state for each rule of the policy.

21 Claims, 8 Drawing Sheets

POLICY EVALUATION TREES

PRIORITY

This application is a continuation under 35 U.S.C. § 120 of U.S. patent application Ser. No. 14/341,028, filed 25 Jul. 2014, which is incorporated herein by reference.

TECHNICAL FIELD

This disclosure generally relates to accessing resources on the Internet.

BACKGROUND

As the Internet becomes integrated into almost every aspect of human life, the amount of content available is growing at an exponential rate. It is common for web providers to operate databases with petabytes of data, while leading content providers are already looking toward technology to handle exabyte implementations.

In addition, the tools used to access this vast resource are growing ever more complex. Although users may believe that they are simply logging into a website, sophisticated server software may search through vast stores of data to gather information relating to the users, for example based on their browsing history, preferences, data access permissions, relationships, location, demographics, etc. Simultaneously, the server may build a custom interface for users, e.g., using server-side languages. Building this interface may include selecting hundreds of content items, such as images, video clips, animation, applets, and scripts. In some cases, these content items may be selected from among a vast array of potential content items based on various policies, e.g., data access policies, privacy policies, optimization policies, etc. (collectively, "policies"). Some of these policies are implemented by software developers whereas other data can be provided by users.

Policies can be useful in social networking websites, e.g., to determine what personal, advertising, or other content to display to users, to determine what actions users can take, etc. Analysis of all of the relevant policies to determine what subset of data to analyze and present can take considerable time. However, unless this process occurs with no perceptible delays, users may lose patience and simply navigate to a different website. Therefore, efficiently determining what content will be gathered and how it may be presented is desirable to reduce website delays caused by analyzing policies.

DESCRIPTION OF EXAMPLE EMBODIMENTS

Technology for reducing delays corresponding to implementing policies is disclosed. Policies can be provided by software developers, e.g., in conjunction with code they provide to determine what data is to be analyzed or presented to users. Policies can also (or instead) be specified by users, e.g., to indicate what data is to be shared or not shared with others. When evaluated, a policy may make a determination regarding whether a particular action should occur with respect to a particular object. For example, a viewing user may access a webpage that may include various objects (e.g., photos, posts, comments, etc., posted by other users). One or more policies may be associated with one or more of the various objects. For example, a photo may be associated with a policy that determines whether a viewing user can view the photo based on the privacy settings set by a user who published the photo. A web server may evaluate each policy for each object to determine whether the content should be included or excluded for viewing by the viewing user. Multiple such policies may need to be evaluated before determining whether to include or exclude the object. These policies are evaluated for each object that is eligible to be shown to the viewing user. When these evaluations are performed for a large number of concurrent viewing users (e.g., millions of concurrent viewing users) using a given pool of computational resources, the latency in obtaining an outcome for a particular object for a particular viewing user may be large. The implementations disclosed herein reduce the computational cost and execution time for evaluating these policies so that the latency in obtaining an outcome for a particular object for a particular viewing user is reduced. In doing so, the overall user experience for all viewing users may be improved.

In some implementations, policies include ordered sets of rules. Each rule in a policy may have a corresponding type. In some implementations, the types may be allow-or-skip and deny-or-skip. An allow-or-skip type indicates that the rule applies by allowing a particular action if its condition is true or the rule does not apply and is skipped if the condition is false. A deny-or-skip type indicates that the rule applies by denying a particular action if its condition is true or the rule does not apply and is skipped if the condition is false. In some implementations, a policy may have non-binary rules or more than two types. For example, a policy may have deny-always or allow-always type rules; a policy may have rules with possible outcomes of allow, deny, skip, and call alternate function.

A policy may be implemented such that the "highest priority" rule that applies (does not skip) in an ordering of the rules controls the outcome of policy. Thus, for example, if a policy has one allow-or-skip rule and one deny-or-skip rule and the corresponding conditions of the two rules are each true, then the content will be displayed if the allow-or-skip rule is higher in the order than the deny-or-skip rule but the content will not be displayed if the deny-or-skip rule is higher in the order than the allow-or-skip rule.

At any given point in an evaluation of a policy, a policy state may be identifiable. A policy state, as used herein, comprises, for each rule of a policy, a rule state, where a rule state is an indication of a rule outcome, a partial rule outcome, or that no outcome is known. As used herein, a rule outcome is the result of evaluating a rule. In some policies, for example, the possible rule outcomes may be allow, deny, or skip. A partial rule outcome, as used herein and referred to as a pending outcome, may result when evaluation of a rule is begun but has been suspended because additional data fetching is required before the final rule outcome can be determined. When no portion of evaluation of a rule has been performed no outcome information is known, which is referred to herein as an unknown rule state. As used herein <U> represents an unknown result, <A> represents an allow result, <D> represents a deny result, <S> represents a skip result, and <F> represents a pending rule outcome. A policy state may be denoted herein as { }, where the state of each rule in a policy is denoted, in order, within the { }. For example, a policy state for a policy with four rules, where the first rule is pending, the second rule has skipped, the third rule state is unknown, and the fourth rule state is allow can be denoted {<P>, <S>, <U>, <A>}.

A policy may have an initial state. In an initial policy state, the outcome of rules with more than one possible outcome are identified as unknown because no processing of these rules has occurred. In some implementations, where a rule has only one possible outcome, such as a denyAll rule, the initial policy state may identify these rules as having their resulting rule outcome. During an evaluation of a policy, the policy may progress from the initial policy state to additional policy states based on the outcome of policy actions. Policy actions, as used herein, are steps taken in the evaluation of a policy. In some implementations, the possible policy actions consist of: run, wait, and finish.

The run policy action may evaluate a particular rule, denoted herein as run(rule_name). For example, running an allowAdministrators rule may be denoted run(allowAdministrators). In some implementations, performing a run policy action for a single rule may yield any of three possible rule outcomes: (1) allow or deny, depending on the rule type; (2) skip; and (3) pending. The wait policy action may occur from a policy state where one or more rules are in the pending partial outcome. The wait policy action completes evaluation of the pending rules such that each pending rule has transitioned in the next state to the allow, deny, or skip outcome. The finish policy action may occur from a policy state A) where an allow-or-skip type rule evaluated to the allow outcome and any deny-or-skip rules with a higher priority evaluated to skip; B) where a deny-or-skip type rule evaluated to the deny outcome and any allow-or-skip rules with a higher priority evaluated to skip; or C) where a policy state has been selected as "pruned," indicating that remaining rules of the policy should be run in parallel until A) or B) occurs. In each of these cases, the result of the policy may be determined as a result of the finish policy action.

Policy rules may not need to be executed in a particular order for a system to determine the correct evaluation of the policy. In a policy where each rule can (1) allow or skip or (2) deny or skip, a system can guarantee that a particular rule that does not skip will provide a correct evaluation of a policy when all the rules with a higher priority of an opposite type skip. Therefore, from any given policy state, there may be a number of policy actions that can be taken to advance evaluation of the policy, and the order that policy actions are selected can affect the rules that need to be evaluated to evaluate a policy.

Policy rules may have associated costs for evaluation of rules and these costs can vary greatly. The costs of evaluating a policy rule can relate to resource costs typically associated with computing, e.g., processor use, network latency, disk latency, etc. For example, an allowAdministrators rule may have a very low cost of retrieving the current user's rights level and determining if that rights level is administrator, whereas a denyIfNotInvited rule may have a much higher cost of retrieving a large list of all invited users and determining whether the current user is on that list.

Thus, because policy rules may have associated costs and because not all rules need to be evaluated to determine a policy result depending on an order in which policy actions are selected, the order in which policy actions are taken may affect policy evaluation efficiency.

The computations to select a series of policy actions that will efficiently evaluate the policy may be too time-consuming to perform during policy evaluation. However, a series of policy actions may be pre-computed to control, given any previous state, which policy action to perform next during the policy evaluation. This series, or hierarchy, of possible policy states and conditional policy actions is referred to herein as a policy evaluation tree. Each node in a policy evaluation tree may correspond to a policy state, and each edge may correspond to a policy action. Each edge may also correspond to one or more rule outcomes either explicitly or by virtue of the resulting policy state comprising a change in a rule state. A policy evaluation tree may have a root node corresponding to the initial state of a policy. From each policy state in the policy evaluation tree, a single next policy action may be defined as the action to be performed given that policy state. The child nodes from each policy state are the possible next policy states that may result by taking the next policy action defined for that policy state. For example, an initial policy state for a policy with the four rules allowAdministrators, denyUninvited, allowWhiteList, and denyAll, may be: {<U>, <U>, <U>, <D>}. A next policy action may specify that run(allowWhiteList) should be performed from the initial policy state. There may be three child states of the initial policy state: {<U>, <U>, <A>, <D>}, corresponding to the circumstance where allowWhiteList evaluates to an allow; {<U>, <U>, <S>, <D>}, corresponding to the circumstance where allowWhiteList evaluates to a skip; and {<U>, <U>, <P>, <D>}, corresponding to the circumstance where allowWhiteList evaluation is not completed and the evaluation of the rule is in the pending state. By analyzing a policy and generating a policy evaluation tree prior to evaluation of a policy, efficiency of later policy evaluation can be improved using the policy evaluation tree.

Figure 1:
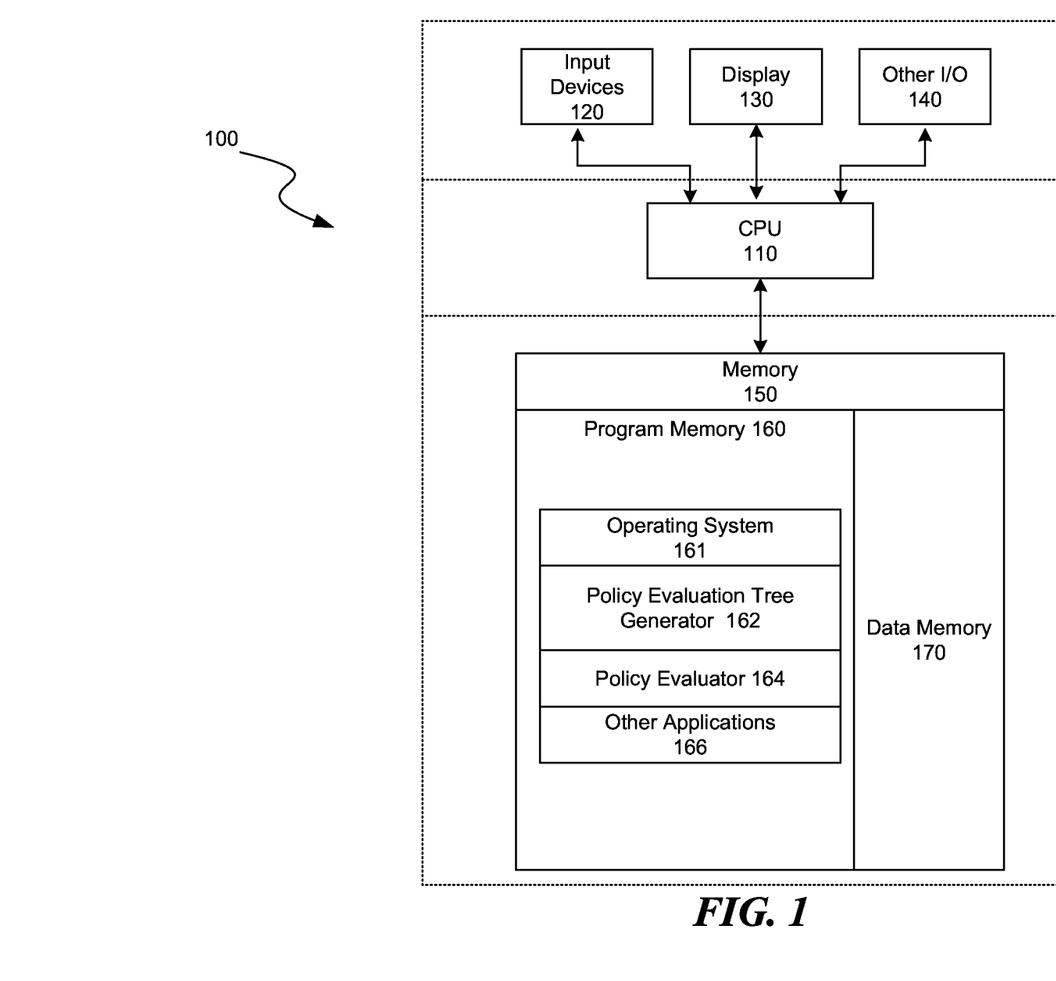
FIG. 1 is a block diagram illustrating an overview of devices on which some embodiments of the disclosed technology may operate.

Several embodiments of the described technology are discussed below in more detail in reference to the FIG.s. Turning now to the FIG.s, FIG. 1 is a block diagram illustrating an overview of devices 100 on which some embodiments of the disclosed technology may operate. The devices may comprise hardware components of a device 100 for generating a policy evaluation tree or evaluating a policy using a policy evaluation tree. Device 100 includes one or more input devices 120 that provide input to the CPU (processor) 110, notifying it of actions performed by a user. The actions are typically mediated by a hardware controller that interprets the signals received from the input device and communicates the information to the CPU 110 using a communication protocol. Input devices 120 include, for example, a mouse, keyboard, a touchscreen, an infrared sensor, a touchpad, wearable input devices, a camera- or image-based input device, microphone, or other user input devices.

CPU 110 may be a single processing unit or multiple processing units in a device or distributed across multiple devices. CPU 110 may be coupled to other hardware devices, for example, with the use of a BUS, such as a PCI BUS or SCSI BUS. The CPU 110 may communicate with a hardware controller for devices, such as for a display 130. Display 130 may be used to display text and graphics. In some examples, display 130 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 may also be coupled to the processor, such as a network card, video card, audio card, USB, firewire or other external devices, a camera, a printer, speakers, a CD-ROM drive, a DVD drive, disk drives, or Blu-Ray devices.

The CPU 110 has access to a memory 150. A memory includes one or more of various hardware devices for volatile and non-volatile storage, and may include both read-only and writable memory. For example, a memory may comprise random access memory (RAM), read-only memory (ROM), writable non-volatile memory, such as flash memory, hard drives, floppy disks, CDs, DVDs, magnetic storage devices, tape drives, device buffers, and so forth. A memory is not a propagating electrical signal divorced from underlying hardware, and is thus non-transitory. The memory 150 includes program memory 160 that contains programs and software, such as an operating system 161, policy evaluation tree generator 162, policy evaluator 164, and any other application programs 166. The memory 150 also includes data memory 170 that includes any configuration data, settings, user options and preferences that may be needed by the program memory 160, or any element of the device 100.

In some implementations, the device 100 also includes a communication device capable of communicating wirelessly or wire-based with a network node. The communication device may communicate with another device or a server through a network using, for example, TCP/IP protocols. For example, device 100 may utilize the communication device to distribute operations across multiple network devices.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
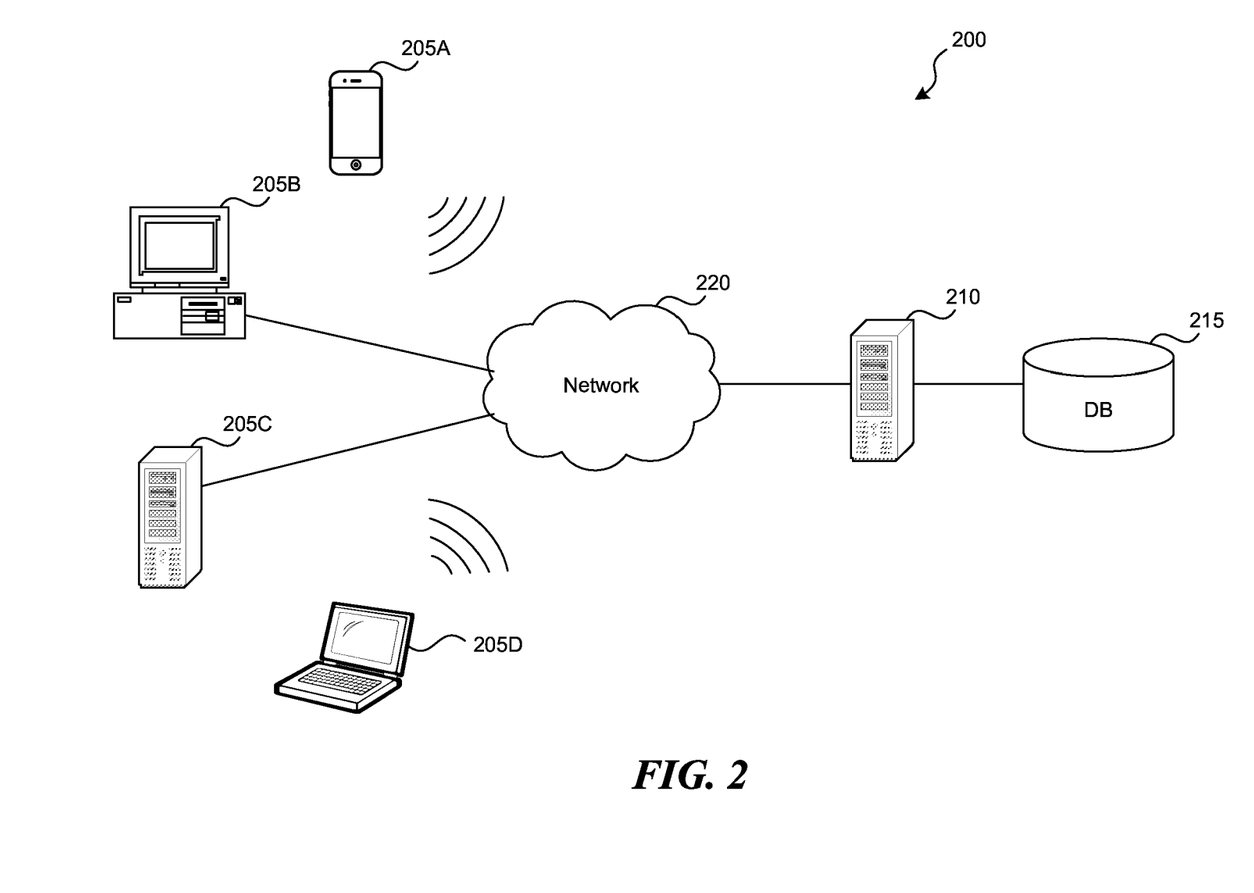
FIG. 2 is a block diagram illustrating an overview of an environment in which some embodiments of the disclosed technology may operate.

FIG. 2 is a block diagram 200 illustrating an overview of an environment in which some embodiments of the disclosed technology may operate. An environment for implementing the technology may include one or more client computing devices 205A-D, examples of which may include device 100. Client computing devices 205 may operate in a networked environment using logical connections to one or more remote computers such as server computing device 210 through network 220. Though server computing device 210 and is displayed logically as a single server, server computing device 210 may be a distributed computing environment encompassing multiple machines located the same or at geographically dispirit physical locations. Client computing devices 205 and server computing device 210 may each act as a server or client to other server/client devices. Server 210 may connect to a database 215. Database 215 may warehouse information such as rule cost and probability information from real world observations, benchmarking, or calculations such as the size of a data set corresponding to a particular rule. Though server computing device 210 and database 215 are displayed logically as a single machine, server computing device 210 and database 215 may each be a distributed computing environment encompassing multiple machines located at the same or at geographically dispirit physical locations.

Network 220 can be a local area network (LAN) or a wide area network (WAN), but may also be other wired or wireless networks. The client computing devices 205 can be connected to network 220 through a network interface, such as by wired or wireless communication.

Figure 3:
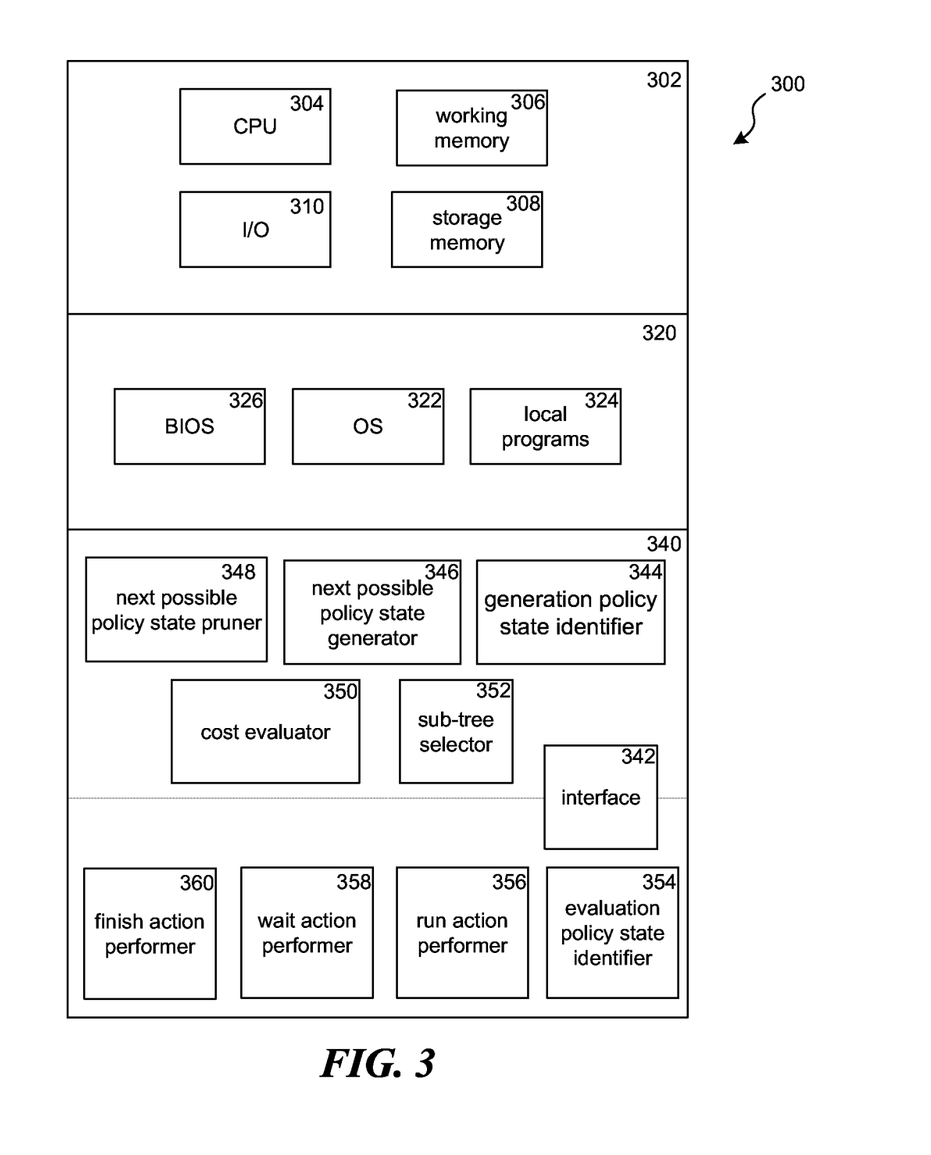
FIG. 3 is a block diagram illustrating components which, in some embodiments, may be used in a system implementing the disclosed technology.

FIG. 3 is a block diagram illustrating components 300 which, in some embodiments, may be used in a system implementing the disclosed technology. The components 300 include hardware 302, general software 320, and specialized components 340. As discussed above, a system implementing the disclosed technology may use various hardware including a central processing unit 304, working memory 306, storage memory 308, and input and output devices 310. Components 300 may be implemented in a client computing device such as client computing devices 205 or on a server computing device, such as server computing device 210.

General software 320 may include various applications including an operating system 322, local programs 324, and a BIOS 326. Specialized components 340 may be subcomponents of a general software application 320, such as a local program 324. Specialized components 340 may include components for generating a policy evaluation tree, such as generation policy state identifier 344, next possible policy state generator 346, next possible policy state pruner 348, cost evaluator 350, and sub-tree selector 352; components for evaluating a policy using a policy evaluation tree such as evaluation policy state identifier 354, run action performer 356, wait action performer 358, and finish action performer 360, as well as components which may be used for policy evaluation tree generation or evaluation, such as interface 342. Some components identified as used for policy tree generation or evaluation may overlap. For example, generation policy state identifier 344 and evaluation policy state identifier 354 may be the same component.

When generating a policy evaluation tree, a policy comprising one or more rules may be received by interface 342. For example, interface 342 may receive rules from any of components 302 or 320, such as when a developer runs a command or when an automated policy evaluation tree generation job is scheduled. Generation policy state identifier 344 may receive the policy from interface 342, and identify the initial state of the policy which may be stored as the root policy state of the policy evaluation tree. The set of possible next policy states may then be determined by next possible policy state generator 346. Next possible policy state generator 346 may determine, for a given state, policy actions that may be performed from that state and the possible policy states that may result from those policy actions. The policy actions may include run(rule), wait, and finish, and may be associated with each next possible policy state. In some implementations, possible next policy states are immediately added as sub-nodes of the state for which the next possible policy state generator 346 generated them. In some implementations, possible next policy states are only added as sub-nodes of the state for which the next possible policy state generator 346 generated them once the sub-tree defined by that sub-node is selected by the sub-tree selector 352.

The next possible policy states generated by next possible policy state generator 346 may be pruned by next state pruner 348. Pruning of a policy state may comprise storing an indication that the next policy action to take from the pruned policy state is the finish policy action. This pruning may be due to a determination that the policy state is very unlikely to occur; that a result of the policy is determinable from the policy state; that from the policy state, the result of the policy is very close to being determinable; or that the cost of performing a policy action that resulted in the policy state relative to the probability of achieving an allow or deny result by performing that policy action is lower than that of performing another policy action. Pruning of next possible policy states is discussed in more detail below in relation to FIG. 6.

By iterating, for each non-pruned next possible policy state, between next possible policy state generator 346 and next possible policy state pruner 348, each next possible policy state may be converted into a sub-tree of the initial policy state. As this process occurs, cost evaluator 350 may compute a cost associated with each pruned policy state or each sub-tree. A cost for a pruned policy state may be a sum of the cost of performing the policy action that resulted in that state and any cost associated with performing a finish policy action from that state. A sub-tree cost may be the sum of the costs associated with each chosen policy action from a given state to a pruned state. Actions may be chosen by sub-tree selector 352 based on the lowest cost sub-trees or pruned policy state attached to the root of the sub-tree. Generation of a policy evaluation tree with pruning is discussed in more detail below in relation to FIGS. 4 and 5.

When evaluating a policy, a policy evaluation tree may be received by interface 342. From the initial state of the policy corresponding to the root node of the policy evaluation tree, the policy action associated with the current policy state is performed. If the policy action associated with the current policy state is a run policy action with an associated rule to run, the associated rule is run by run action performer 356. If the rule is an allow-or-skip type rule, the possible rule outcomes may be allow, skip, or pending. If the rule is a deny-or-skip type rule, the possible rule outcomes may be deny, skip, or pending. If the policy action associated with the current policy state is a wait policy action, the policy action is performed by wait action performer 358. Wait action performer 358 may determine all the rules in the current policy state that are pending, either based on a state associated with each policy state or based on another stored set of identifiers, such as a stack or list. For each rule in the pending state when a wait policy action is performed a non-pending outcome is determined. If the rule is an allow-or-skip type rule, the possible rule outcomes may be allow or skip, and if the rule is a deny-or-skip type rule, the possible rule outcomes may be deny or skip. If the policy action associated with the current policy state is a finish policy action, the policy action is performed by finish action performer 360. If a result of the policy cannot be determined from the current policy state, finish action performer 360 selects one or more rules to run in parallel so that, once the selected rules are run, a result of the policy will be determined. Once a result of the policy can be determined, finish action performer 360 computes and returns the policy result.

The rule outcome or rule outcomes of a run policy action or a wait policy action may be passed to evaluation policy state identifier 354. Evaluation policy state identifier 354 may determine the next state of the policy based on the rule outcome or outcomes and set as the current state the child node corresponding to the determined next state. Components 354-358 may repeat these steps until a finish policy action is reached. Evaluation of a policy using a policy evaluation tree is discussed in more detail below in relation to FIG. 7.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. Some processes described below are described in terms of recursive algorithms. Those skilled in the art will further appreciate that equivalent implementations may be created without recursion.

Figure 4:
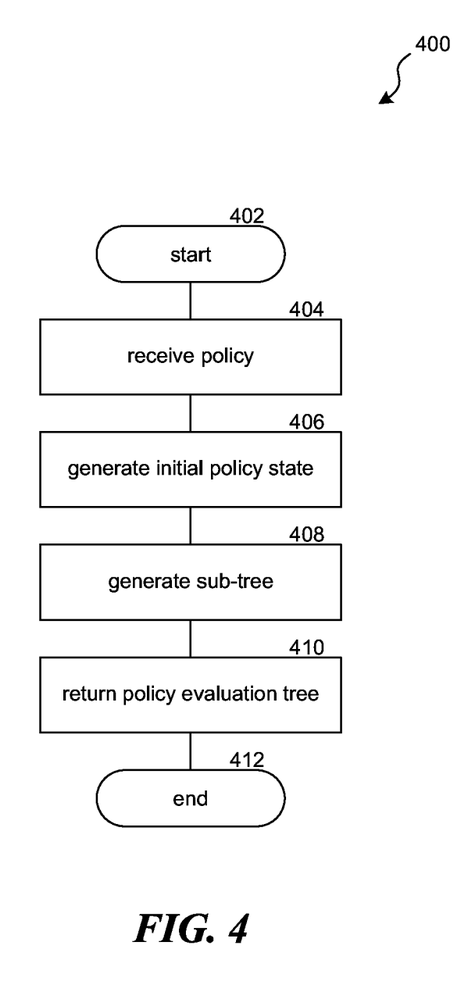
FIG. 4 is a flow diagram illustrating a process used in some embodiments for generating, based on a received policy, a policy evaluation tree.

FIG. 4 is a flow diagram illustrating a process 400 used in some embodiments for generating, based on a received policy, a policy evaluation tree. The process begins at step 402 and continues to step 404. At step 404, the process receives an indication of a policy for which the process will generate a policy evaluation tree.

Next, at step 406, the process determines an initial state of the policy. This initial policy state will indicate that any rule that has more than one possible outcome is in the unknown rule state and any rule which has only one potential outcome is in the rule state associated with that outcome. For example, an initial policy state for a policy with the four rules allowAdministrators, denyUninvited, allowWhiteList, and denyAll, may be: {<U>, <U>, <U>, <D>}.

The process then continues to step 408, where it generates one or more sub-trees from the initial policy state, which are attached as children of the initial policy state. Generation of sub-trees may be based on possible policy actions that can be taken from the initial state and an evaluation of the cost and/or likelihood of each. In some implementations, generating a sub-tree may use a cost passed from the generated portion of the tree. From the initial state, the cost passed to the process that generates sub-trees may be zero. Generating policy evaluation sub-trees based on cost is discussed in more detail below in relation to FIG. 5. The process then continues to step 410, where the generated policy evaluation tree is returned. The process then continues to step 412, where it ends.

Figure 5:
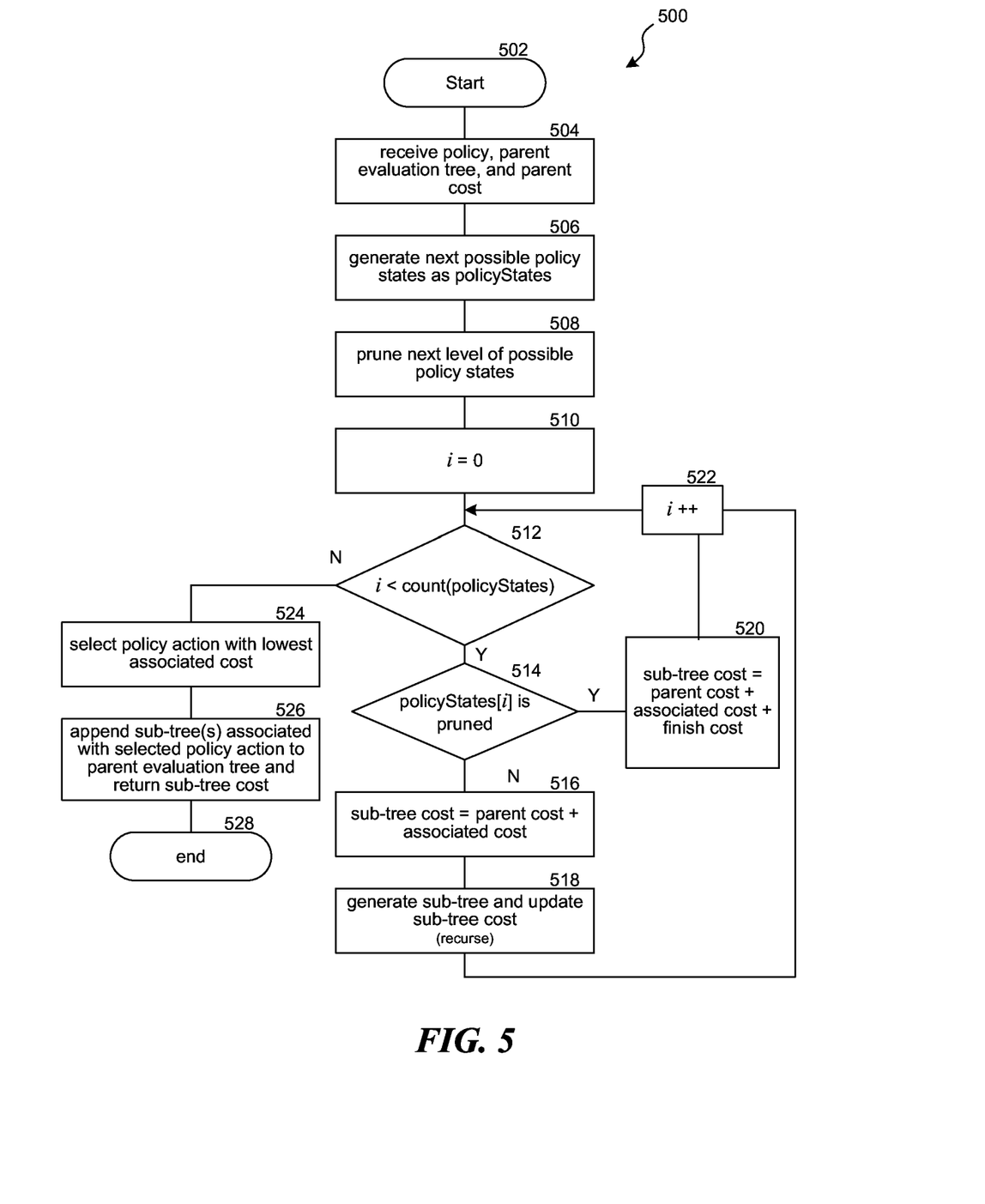
FIG. 5 is a flow diagram illustrating a process used in some embodiments for generating, based on a received policy and a portion of a policy evaluation tree, one or more sub trees to append to the received policy evaluation tree.

FIG. 5 is a flow diagram illustrating a process 500 used in some embodiments for generating, based on received indications of a policy and a portion of a policy evaluation tree, one or more sub-trees to append to the received policy evaluation tree. Process 500 may be called from step 408 of process 400 or may be called recursively from step 516 of process 500. Process 500 begins at step 502 and continues to step 504. At step 504 the process receives a policy, a parent policy evaluation tree with an indicated current state, and a cost associated with the parent policy evaluation tree. When process 500 is called from step 408, the parent evaluation tree may be the initial state generated in step 406, which is also the current state, and the cost may be zero.

Process 500 continues to step 506 where it generates the next possible policy states. The generated next possible policy states comprise, for the current state, the policy states that may result from any of the possible policy actions— run(rule), wait, and finish—that may be performed from the current state. For example, a current policy state for a policy with the four rules: allowAdministrators, denyUninvited, allowWhiteList, and denyAll, may be: {<U>, <P>, <U>, <D>}. The policy actions that may be taken from this policy state are run(allowAdministrators), run(allowWhiteList), and wait. The possible policy states that result from run (allowAdministrators) are {<A>, <P>, <U>, <D>}, {<S>, <P>, <U>, <D>}, and {<P>, <P>, <U>, <D>}. The possible policy states that result from run(allowWhiteList) are {<U>, <P>, <A>, <D>}, {<U>, <P>, <S>, <D>}, and {<U>, <P>, <P>, <D>}. The possible policy states that result from the wait policy action are {<U>, <D>, <U>, <D>} and {<U>, <S>, <U>, <D>}. In this example, these eight states would be the next possible policy states generated at step 506. As shown in process 500, next possible policy states may be stored in a policyStates array. However, other methods for storing the next possible policy states may be used.

In some implementations, some next possible policy states may not be generated where those policy states do not materially advance evaluation of a policy. For example, from the policy state for the policy with the rules: allowAdministrators, denyAdvertisers, allowInvitees, denyAll and the policy state: {<13>, <D>, <U>, <D>}, because the denyAdvertisers rule already has a Deny outcome, there is no need to perform the run(allowInvitees) policy action as the outcome of that lower priority rule will not affect the result of the policy. Therefore, the next possible policy states resulting from the run (allowInvitees) policy action, {<13>, <D>, <A>, <D>}, {<13>, <D>, <S>, <D>}, and {<13>, <D>, <P>, <D>}, need not be generated in step 506.

In addition, in some implementations, for the wait policy action where multiple policy rules may be run in parallel, next possible policy states may be combined where the outcome of a particular rule is irrelevant to the result of the policy. For example, if a wait policy action is performed from policy state: {<U>, <P>, <D>, <P>, <D>}, where both rules in the <F> pending state are allow-or-skip type rules, of the four possible resulting next policy states of the wait policy action, the {<U>, <A>, <D>, <A>, <D>} and {<U>, <A>, <D>, <S>, <D>} next policy states are functionally equivalent because it will not matter what happens in the lower priority rule if the higher priority rule results in an allow. In this case, step 506 may combine these policy states into a single next possible policy state: {<U>, <A>, <D>, <A/S>, <D>}. In some implementations, step 506 may combine all next possible policy states where the difference between the policy states is only in rule outcomes for rules with a priority lower than a rule with an allow or deny outcome. This may be denoted as a single next policy state: {<U>, <A>, <*>}, where <*> indicates that though one or more additional rules may exist with priorities below the evaluated rules, they will not affect the policy outcome.

Next, at step 508, any of the next possible states may be pruned. When a state is pruned it is marked as not generating any further next policy states, and only the finish policy action will be taken from this state. Policy states that do not have any next policy states are referred to as leaf policy states of the policy evaluation tree. Conversely, policy states that have any child next policy states are referred to as non-leaf policy states of the policy evaluation tree. In some implementations, when a state is marked as pruned, the only action that may be taken from that state is the finish policy action. The finish policy action evaluates in parallel a set of the rules that have not been completely evaluated such that a result of the policy is determined. Pruning is discussed in more detail below in relation to FIG. 6.

At step 510, a counter variable i is set to 0. Counter variable i is used by the loop defined between step 512 to 522 to cycle through all the policy states in policyStates.

At step 512, process 500 checks whether all of the policy states in policyStates have been cycled through. If so, process 500 continues to step 524, otherwise process 500 cycles through steps 514 to 522 for the i-th next possible policy state, denoted policyStates[i].

At step 514, process 500 determines whether, at step 508, policyStates[i] was pruned. If so, this mean that no further next possible policy states will be generated from policyStates[i] so, at step 520, a total cost for the sub-tree ending with policyStates[i] can be calculated. If policyStates[i] has not been pruned, process 500 updates the cost at step 516 and recurses at step 518, thereby generating the full sub-tree of policy states below policyStates[i], with an associated cost.

At step 516, the sub-tree cost is updated to account for the policy action taken to reach policyStates[i]. This occurs by summing the cost for generating the parent tree, passed to process 500 at step 504 with the cost associated with the policy action that resulted in the transition from the current state to policyStates[i]. If the policy action that resulted in the transition from the current state to policyStates[i] is a run policy action for a rule, the cost of the policy action may be the evaluation cost of that rule, which may be based on a calculation such as the number of instructions to evaluate the or may be based on historical data for the cost of evaluating this rule. If the policy action that resulted in the transition from the current state to policyStates[i] is a wait policy action, the cost of the policy action is the data fetch cost to complete evaluation of all rules in the policy for which policyStates[i] indicates those rules have a partial policy outcome. In some implementations data fetching may occur in parallel, so the cost of the wait policy action may be the largest single data fetch cost associated with the policy rules for which the wait policy action will be performed. In some implementations, the wait cost may also account for additional processing costs that will be performed to complete evaluation of one or more of the rules evaluated by the wait policy action.

Recursing at step 518 comprises calling process 500 again: passing the policy; passing the policy evaluation tree received in step 504 with policyStates[i] appended to the current state, with the added policyStates[i] set as the current state; and passing the cost calculated in step 516. The result of calling process 500 from step 518 is a sub-tree with an associated cost. The cost for the policyStates[i] sub-tree is updated to be the cost associated with the sub-tree. For some policy actions such as wait and run, a policy action may result in multiple next possible states depending on the outcome of the evaluated rules, and each of these next possible policy states may have a corresponding lower hierarchy of policy states. The cost for the sub-tree resulting from a policy action that has multiple lower hierarchies may be a weighted cost of each lower hierarchy, based on a likelihood that lower hierarchy will be the result of the policy action. For example, if from a first policy state a policy action is run(allowAdministrators) (as in 836 of FIG. 8), there may be three potential rule outcomes, <A>, <S>, and <P>, which each result in a lower hierarchy. The cost of each lower hierarchy may be computed recursively, and the cost of the run(allowAdminsitrators) rule may be computed by combining the cost of each lower hierarchy. In some embodiments, the likelihoods for a policy action may be probabilities and sum of the probabilities for that policy action may be 100%. This combining may occur by determining a likelihood that each outcome <A>, <S>, and <F> will occur, which may be based on historical data, and summing the product of each lower hierarchy cost with the corresponding likelihood. For example, it may be determined that the probability of the <A> outcome is 3% and the cost of the <A> lower hierarchy is 5; the probability of the <S> outcome is 95% and the cost of the <S> lower hierarchy is 50; and the probability of the <P> outcome is 2% and the cost of the <A> lower hierarchy is 10. The cost associated with the run(allowAdminsitrators) may then be computed as cost[run(allowAdminsitrators)]=0.03*5+0.95*50+0.02*10=47.85

Process 500 then continues to step 522 where i is incremented so that the loop between steps 512 and 522 will cycle through the subsequent next possible policy state.

When at step 514, policyStates[i] has been pruned, process 500 continues to step 520 where it computes the cost of the sub-tree ending with the policyStates[i] pruned state. This occurs by summing: the cost for generating the parent tree which was passed to process 500 at step 504; the cost associated with the policy action that resulted in the transition from the current state to policyStates[i]; and any cost required to perform a finish policy action to determine an outcome of the policy from policyStates[i]. Computing cost associated with the policy action that resulted in the transition from the current state to policyStates[i] is discussed above in relation to step 516. In some cases, a policy state will be pruned because a policy result can be determined from the policy state without further rule evaluation. In these cases, the finish cost may be zero. In other cases, for a policy result to be determined from a pruned policy state, the finish policy action may require additional rules to be evaluated. In these cases, the finish policy action is performed by selecting one or more rules to run in parallel, or a sequence of rule groups to run such that a result of the policy may be determined. The cost of running each rule group may be the sum of A) the cost of the data-fetch for the rule in the group whose data-fetch takes the longest with B) the sum of the processing cost of each of the rules in the group. In addition, at step 520, the finish policy action may be associated with policyStates[i].

Once the loop between step 512 to 522 has cycled through all the next possible policy states, process 500 continues to step 524, where it selects a policy action to be taken from the current state based on the cost of the sub-tree associated with each next possible policy state. In some implementations this is the selection of the sub-tree with the lowest cost.

Next, at step 526, the sub-trees associated with the selected policy action are appended to the current policy state and the cost of the sub-tree is returned. In some implementations, the policy action that resulted in the selected sub-tree will be associated with the current policy state. In some implementations, the rule outcome that resulted in each next policy state will be associated with that policy state. During evaluation of the policy using the policy evaluation tree, the policy action associated with any state in the policy evaluation tree will indicate what policy action should be taken from that state. Process 500 then ends at step 528.

Figure 6:
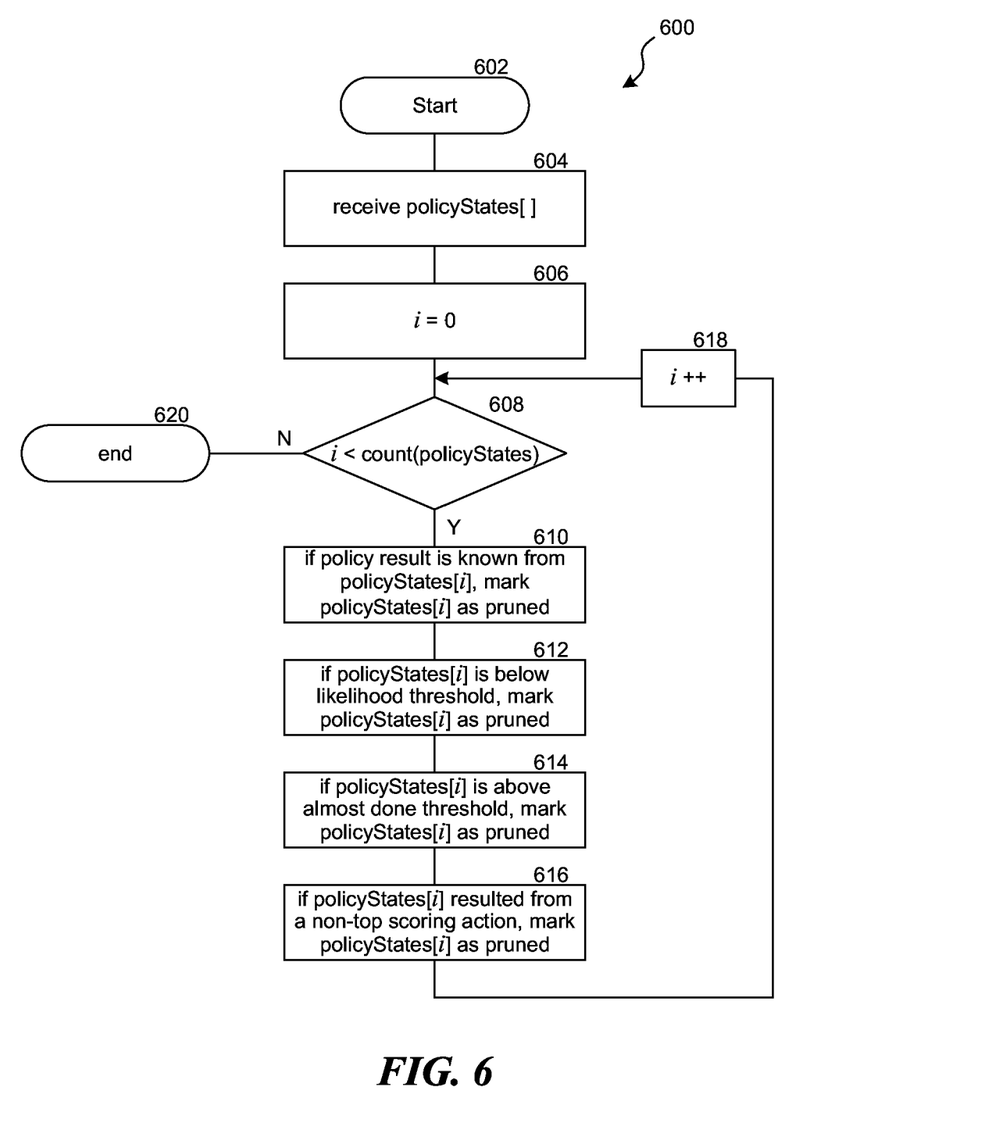
FIG. 6 is a flow diagram illustrating a process used in some embodiments for identifying policy states as pruned.

FIG. 6 is a flow diagram illustrating a process 600 used in some embodiments for identifying policy states as pruned. The process begins at step 602 and continues to step 604. At step 604, the process receives an indication of one or more policy states. At step 606, process 600 begins a loop that will cycle through each of the indicated policy states. The loop cycles through the received policyStates, operating on the i-th policy state. At step 606 counter i is set to zero.

At step 608, process 600 determines whether the current value of i is less than the number of received policy states, denoted count(policyStates). Until the loop between steps 608 to 618 has cycled through all received policyStates this check will return false and continue onto step 610.

At step 610, process 610 determines whether a result of the policy can be determined from policyStates[i]. A result of the policy can be determined if either A) a rule outcome in the policy state is allow and all of the rules in the policy that are of the deny type and that have a higher priority than the rule with the allow outcome have a skip outcome or B) a rule outcome in the policy state is deny and all of the rules in the policy that are of the allow type and that have a higher priority than the rule with the deny outcome have a skip outcome. If, from policyStates[i], a result of the policy can be determined, policyStates[i] is marked as pruned.

At step 612, process 600 determines whether the likelihood of reaching policyStates[i] during evaluation of the policy is below a likelihood threshold. This determination may be based on historical data recorded for the policy. In some implementations, the historical data is recorded for multiple previous evaluations of the policy comprising ratios between the number of times a policy state is encountered and the number of times the policy has been evaluated. In some implementations, the likelihood threshold is one of 1%, 5% or 10%. If, the likelihood of reaching policyStates[i] is determined to below the likelihood threshold, policyStates[i] is marked as pruned.

At step 614, process 600 determines whether, beyond a completion threshold, a result of the policy is almost found. This determination may be based on historical data recorded for the policy. In some implementations, the historical data is recorded for multiple previous evaluations of the policy comprising ratios between the cost necessary to reach a policy state and the additional cost that is necessary to reach a policy state from which a policy result can be determined. In some implementations, the completion threshold is one of 99%, 90%, 80%, or 75%. If, from policyStates[i], a result of the policy is almost found beyond the completion threshold, policyStates[i] is marked as pruned.

At step 616, process 600 determines whether a score for the policy action that resulted in policyStates[i] is sufficient. The score for the policy action may be computed based on historical data recorded for the policy. In some implementations, the score may be computed as the probability, based on the historical data, that the policy action will have an allow or deny outcome divided by a cost computed for the policy action that resulted in policyStates[i]. The cost computed for the policy action that resulted in policyStates[i] may be normalized to a particular scale. In some implementations, determining whether the score is sufficient is based on the score being above a score threshold. In some implementations, determining whether the score is sufficient depends on a comparison to the other scores in policyStates[i]. For example, it may be that the only sufficient score is for the policy states that are associated with the highest scoring policy action for all the policy states in policyStates. In another example, it may be that the only sufficient scores are for the policy states that are associated with the policy actions for a top percentage or number for all the policy states in plicyStates, such as the top one policy score, the top three policy action scores, or the top 25% of the policy action scores. In some implementations, the sufficiency of a score may be based on a comparison of historical score data for the policy or for historical data across multiple policies. In some implementations, for some calls to process 600, all of policyStates may be associated with a policy action with a sufficient score. In addition, in some implementations, for some calls to process 600, none of policyStates may be associated with a policy action with a sufficient score. If the score for the policy action that resulted in policyStates[i] is not determined to be sufficient, policyStates[i] is marked as pruned.

Once the tests for determining whether policyStates[i] should be marked as pruned in steps 610 to 616, process 600 continues to step 618 where i is incremented so the loop between step 608 to 618 will cycle through the next policy state in policyStates until all the policy states in policyStates have be checked for pruning. Once, at step 608, process 600 determines that all the policy states in policyStates have be checked for pruning, process 600 continues to step 620, where it ends.

Figure 7:
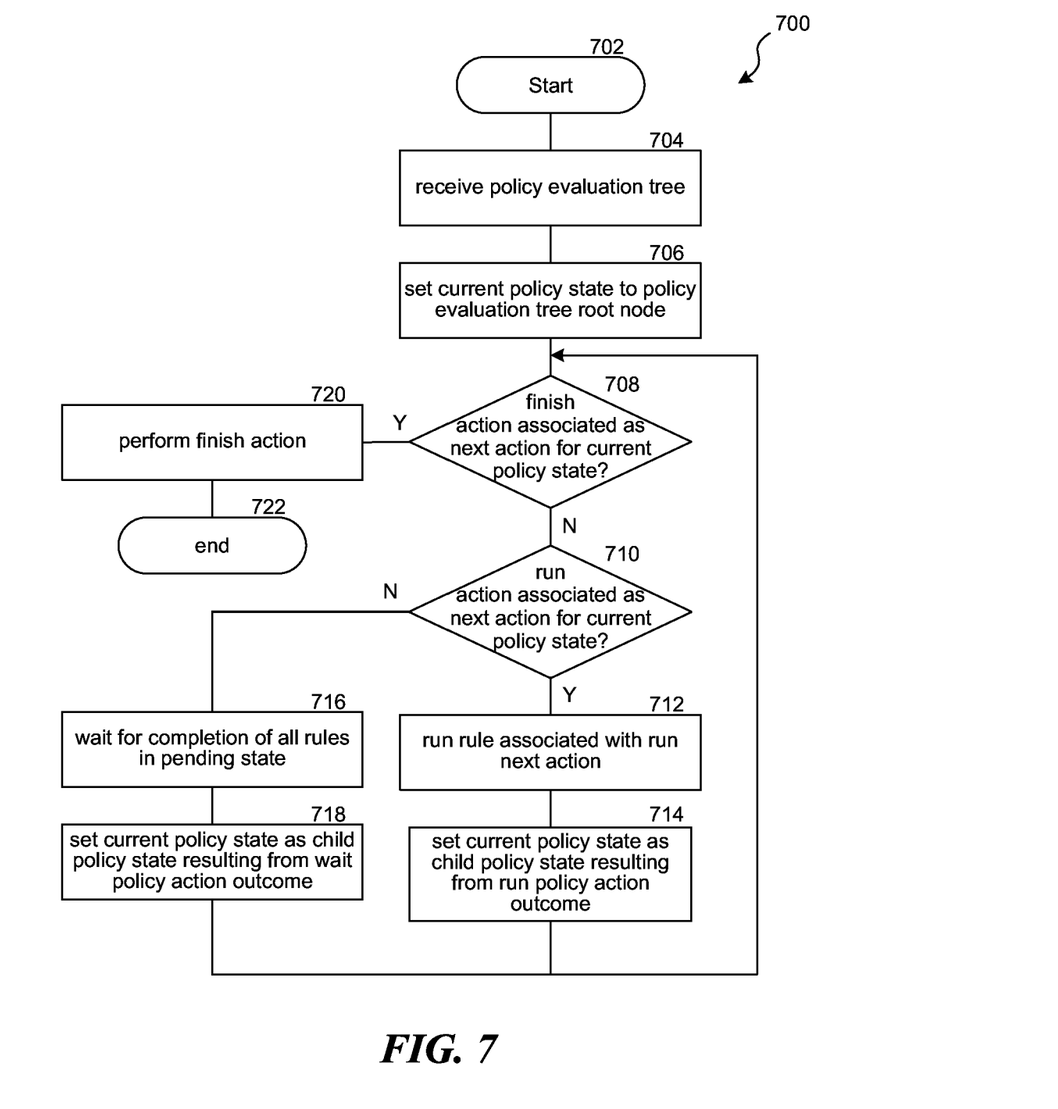
FIG. 7 is a flow diagram illustrating a process used in some embodiments for evaluating a policy using a policy evaluation tree.

FIG. 7 is a flow diagram illustrating a process 700 used in some embodiments for evaluating a policy using a policy evaluation tree. The process begins at step 702 and continues to step 704. At step 704, the process receives an indication of a policy and a policy evaluation tree generated for evaluation of the received policy. The policy evaluation tree may indicate, from any given policy state in the policy evaluation tree, an associated policy action which should be taken from that policy state to progress evaluation of the policy.

Next, at step 706, the process determines the initial state of the policy. This may be accomplished by determining a state for each rule in the policy or by taking the root policy state of the policy evaluation tree as the initial state of the policy. The process then, at step 708, begins a loop that will continue until a finish policy action determining a policy result is performed.

At step 706, process 700 sets a variable indicating the current state of the policy to be the root state of the received policy evaluation tree. Process 700 will then cycle through the loop between blocks 708 to 718 until a finish policy action is associated with the current policy state, indicating that evaluation of the policy has progressed to a point where either a result of the policy can be calculated or a remaining group or sequence of rule groups should be evaluated, with all the rules in each group evaluated in parallel, to determine the policy result. At block 708, process 700 checks whether a finish policy action is associated with the current policy state, if so process 700 continues to step 720, otherwise additional run or wait policy actions should be performed to evaluate the policy, and process 700 progresses to step 710 to continue rule evaluation by performing these actions.

At step 710, process 700 determines whether the policy action associated with the current policy is a run policy action. If so the, process 700 continues to step 712 where this run policy action, which will be associated with a particular rule to run, is performed. The result will be a new policy state where the outcome of the associated rule will be updated to one of allow, deny, skip, or pending. Once the run policy action has been performed, process 700 continues to step 714, where the state of the policy resulting from the run policy action is determined and the child node of the current state corresponding to the state of the policy is set as the new current state. Process 700 then continues back to step 708.

If, at step 710, the policy action associated with the current policy is a wait policy action, process 700 continues to step 716 where the wait policy action is performed by waiting until all rules with a pending outcome have been fully evaluated into an allow, deny, or skip outcome. In some implementations, once a higher priority rule has been evaluated to an allow or deny outcome, evaluation of lower priority rules may cease, as their outcomes will not affect the result of the policy. Once the wait policy action has been performed, process 700 continues to step 718 where the state of the policy resulting from the wait policy action is determined and the child node of the current state corresponding to the state of the policy is set as the new current state. Process 700 then continues back to step 708.

If, at step 708, a finish policy action is associated with the current policy state, process 700 continues to step 720, where the finish policy action is performed. If, at step 720, a policy result can be determined from the current policy state without further rule evaluation, the finish policy action is simply determining and returning the policy result. Otherwise, the finish policy action is performed by selecting one or more rules to run in parallel, or a sequence of rule groups to each run in parallel, such that a result of the policy may be determined. Once sufficient rules have been evaluated, process 700 determines and returns the policy result. Process 700 then continues to step 722, where it ends.

Figure 8:
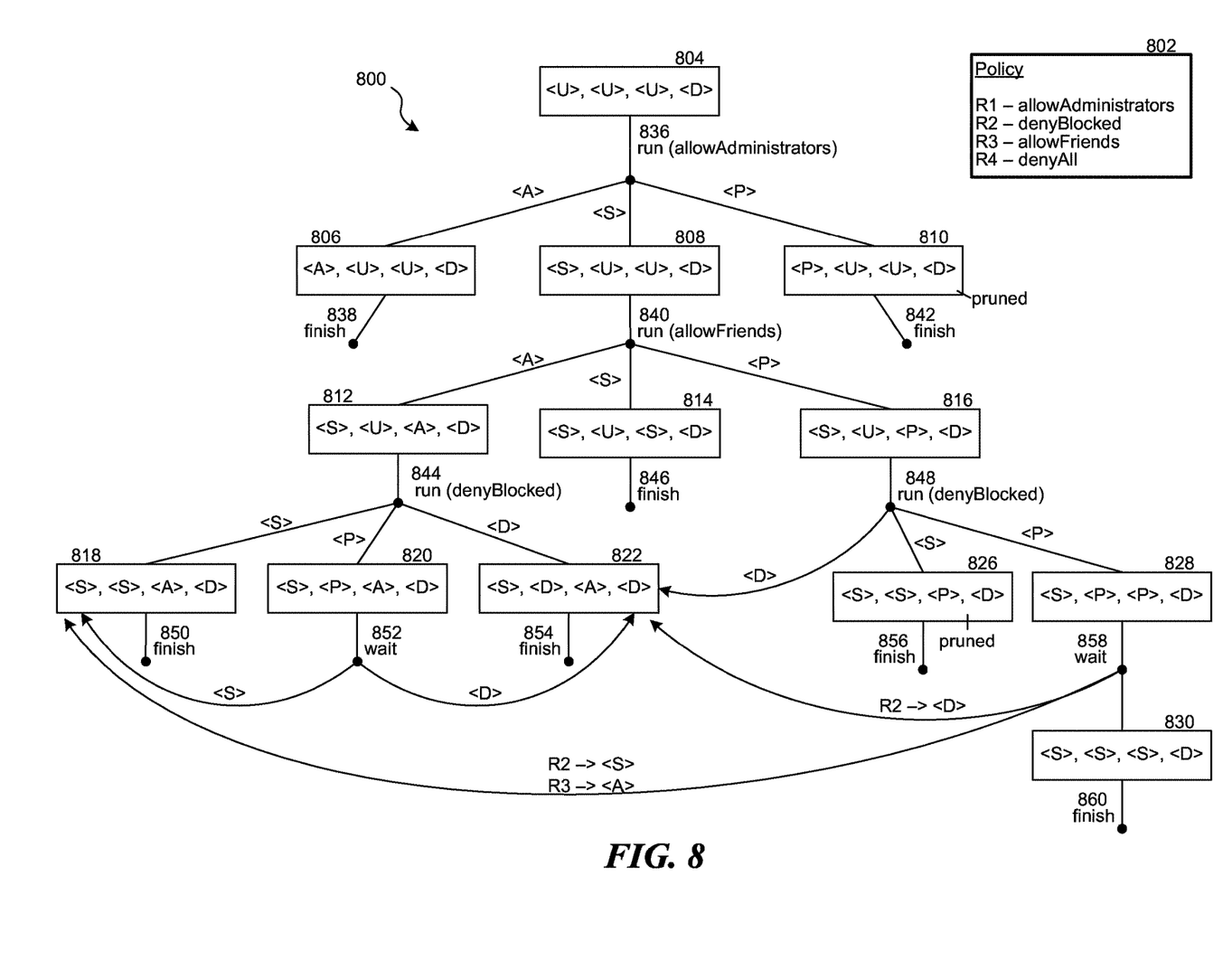
FIG. 8 illustrates an example of a representation of a policy evaluation tree.

FIG. 8 illustrates an example 800 of a representation of a policy evaluation tree that may result from process 400-600 operating on ordered policy 802, and which may be used by process 700 to evaluate policy 802. Each box 804-830 represents a possible policy state in the evaluation of policy 802. Box 804, the root of the policy evaluation tree, represents the initial state of policy 802. Each policy action 836-860 indicates the policy action that should be taken from the policy state above that policy action in the policy evaluations tree. For example, from policy state 804, policy action 836—run(allowAdministrators), should be performed. Depending on the outcome of run(allowAdministrators), one of the child policy states of policy state 804 will result.

If the outcome of run(allowAdministrators) is allow <A> then the resulting policy state with be policy state 806. If the outcome of run(allowAdministrators) is skip <S> then the resulting policy state with be policy state 808. If the outcome of run(allowAdministrators) is pending <P> then the resulting policy state with be policy state 810.

From policy state 806 a policy result can be determined, so the policy action from policy state 806 is finish. In this example, during creation of the policy evaluation tree, historical data for policy 802 indicated that reaching policy state 810 was very unlikely, thus policy state 810 was pruned, so the policy action from policy state 810 is also finish.

If the outcome of run(allowAdministrators) from policy 804 is skip <S> then the resulting policy state with be policy state 808. Policy 802 may be further evaluated from policy state 808 by performing the policy action associated with the current policy state and updating the current policy state according to the resulting policy action outcome, which may be repeated until a finish policy action is reached. When a finish policy action is reached, the finish policy action yields a policy result.

As discussed above, in some implementations, a policy evaluation tree may have edges that, instead connecting to a true child node, connect to an equivalent policy state that already exists in the policy evaluation tree. For example, from policy state 828, the corresponding policy action 858 is wait. When a result of this policy action is that the pending denyBlocked rule (R2) has a deny <D> outcome, the only other rule outcome in the policy that affects the policy outcome is allowAdministrators (R1), which has already been determined to have a skip <S> outcome. Accordingly, the wait policy action from state 828, where R2 has a <D> result, a child policy state may be any policy state matching {<S>, <D>, <*>}. In this example, policy state 822 matches policy state {<S>, <D>, <*>}. Therefore policy state 822 has been connected is a child of policy state 828.

Several embodiments of the disclosed technology are described above in reference to the FIG.s. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but that various modifications may be made without deviating from the scope of the embodiments and implementations. The specific features and acts described above are disclosed as example forms of implementing the claims that follow. Accordingly, the embodiments and implementations are not limited except as by the appended claims.

What is claimed is:

1. A method comprising, by one or more computing devices:
    accessing a plurality of policy states associated with a policy;
    determining that a particular policy state of the plurality of policy states should not be pruned; and
    generating, for the particular policy state for a policy evaluation tree, possible next policy states based on one or more policy actions and one or more costs associated with the respective one or more policy actions,
        wherein each of the one or more policy actions is associated with one or more probabilities indicating one or more possibilities of resulting in one or more of the possible next policy states by performing the respective policy action,
        wherein the respective cost associated with each policy action is determined based on one or more computing costs of the policy action resulting in the one or more of the possible next policy states, respectively, each of the computing costs being positively weighted proportionally by a respective probability of the policy action resulting in one of the possible next policy states by performing the respective policy action,
        wherein each of the one or more computing costs comprises a cost for evaluation of one or more rules associated with the respective policy action, wherein each computing cost comprising the cost for evaluation of the rules is determined based on a type of the respective policy action,
        wherein each of the one or more computing costs further comprises a cost for data fetching, wherein each computing cost comprising the cost for data fetching is determined based on the type of the respective policy action, and
        wherein each policy state of the policy evaluation tree comprises a rule state for each rule of the policy.

2. The method of claim 1, wherein each of the one or more computing costs is based on one or more of processor use, network latency, or disk latency.

3. The method of claim 1, wherein determining that the particular policy state of the plurality of policy states should not be pruned is based on one or more pruning criteria.

4. The method of claim 3, wherein the one or more pruning criteria comprises one or more of:
    a likelihood of the particular policy state occurring is below a threshold value;
    a result of the policy is determinable from the particular policy state; or
    a cost of performing a policy action that resulted in the particular policy state relative to a probability of achieving an allow or deny result by performing that policy action is lower than that of performing another policy action.

5. The method of claim 4, wherein the threshold value is 1%.

6. The method of claim 4, wherein the likelihood of the particular policy state occurring being below the threshold value is determined based on historical data for the policy.

7. The method of claim 1, wherein the policy comprises a plurality of rules.

8. The method of claim 7, wherein each policy state comprises an identification of a rule state for each rule in the policy.

9. The method of claim 8, wherein each rule state comprises one of:
    an outcome comprising one of allow, deny, or skip;
    a partial rule outcome; or
    an unknown rule outcome.

10. The method of claim 9, wherein a result of the policy is determinable from the particular policy state if a rule outcome in the particular policy state is allow and all the rules in the policy that are of a deny type and that have a higher priority than the rule with an allow outcome have a skip outcome.

11. The method of claim 9, wherein a result of the policy is determinable from the particular policy state if a rule outcome in the particular policy state is deny and all the rules in the policy that are of an allow type and that have a higher priority than the rule with a deny outcome have a skip outcome.

12. The method of claim 9, wherein at least one generated possible next policy state is associated with both a policy action that would yield that possible next policy state and one or more rule outcomes that would yield that possible next policy state.

13. The method of claim 1, wherein the policy defines a priority ordering among a plurality of rules.

14. The method of claim 1, wherein each of the one or more policy actions comprises one of:
    running an identified rule,
    waiting for all partially run rules to complete, or
    performing a finish policy action.

15. The method of claim 1, wherein the respective policy action operates on an associated rule of the policy, and wherein each of the one or more computing costs comprises the cost for data evaluation of the associated rule or data fetching of the associated rule corresponding to the type of the respective policy action.

16. One or more computer-readable non-transitory storage media embodying software that is operable when executed to:
- access a plurality of policy states associated with a policy;
- determine that a particular policy state of the plurality of policy states should not be pruned; and
- generate, for the particular policy state for a policy evaluation tree, possible next policy states based on one or more policy actions and one or more costs associated with the respective one or more policy actions,
  - wherein each of the one or more policy actions is associated with one or more probabilities indicating one or more possibilities of resulting in one or more of the possible next policy states by performing the respective policy action,
  - wherein the respective cost associated with each policy action is determined based on one or more computing costs of the policy action resulting in the one or more of the possible next policy states, respectively, each of the computing costs being positively weighted proportionally by a respective probability of the policy action resulting in one of the possible next policy states by performing the respective policy action,
  - wherein each of the one or more computing costs comprises a cost for evaluation of one or more rules associated with the respective policy action, wherein each computing cost comprising the cost for evaluation of the rules is determined based on a type of the respective policy action,
  - wherein each of the one or more computing costs further comprises a cost for data fetching, wherein each computing cost comprising the cost for data fetching is determined based on the type of the respective policy action, and
  - wherein each policy state of the policy evaluation tree comprises a rule state for each rule of the policy.

17. The media of claim 16, wherein each of the one or more computing costs is based on one or more of processor use, network latency, or disk latency.

18. The media of claim 16, wherein determining that the particular policy state of the plurality of policy states should not be pruned is based on one or more pruning criteria.

19. The media of claim 18, wherein the one or more pruning criteria comprises one or more of:
- a likelihood of the particular policy state occurring is below a threshold value;
- a result of the policy is determinable from the particular policy state; or
- a cost of performing a policy action that resulted in the particular policy state relative to a probability of achieving an allow or deny result by performing that policy action is lower than that of performing another policy action.

20. The media of claim 16, wherein the policy comprises a plurality of rules.

21. A system comprising: one or more processors; and a non-transitory memory coupled to the processors comprising instructions executable by the processors, the processors operable when executing the instructions to:
- access a plurality of policy states associated with a policy;
- determine that a particular policy state of the plurality of policy states should not be pruned; and
- generate, for the particular policy state for a policy evaluation tree, possible next policy states based on one or more policy actions and one or more costs associated with the respective one or more policy actions,
  - wherein each of the one or more policy actions is associated with one or more probabilities indicating one or more possibilities of resulting in one or more of the possible next policy states by performing the respective policy action,
  - wherein the respective cost associated with each policy action is determined based on one or more computing costs of the policy action resulting in the one or more of the possible next policy states, respectively, each of the computing costs being positively weighted proportionally by a respective probability of the policy action resulting in one of the possible next policy states by performing the respective policy action,
  - wherein each of the one or more computing costs comprises a cost evaluation of one or more rules associated with the respective policy action, wherein each computing cost comprising the cost for evaluation of the rules is determined based on a type of the respective policy action,
  - wherein each of the one or more computing costs further comprises a cost for data fetching, wherein each computing cost comprising the cost for data fetching is determined based on the type of the respective policy action, and
  - wherein each policy state of the policy evaluation tree comprises a rule state for each rule of the policy.

* * * * *